(12) United States Patent
Fukuike

(10) Patent No.: US 10,857,904 B2
(45) Date of Patent: Dec. 8, 2020

(54) VEHICLE

(71) Applicant: TOYOTA JIDOSHA KABUSHIKI KAISHA, Toyota (JP)

(72) Inventor: Takayuki Fukuike, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 16/408,569

(22) Filed: May 10, 2019

(65) Prior Publication Data

US 2019/0366869 A1 Dec. 5, 2019

(30) Foreign Application Priority Data

Jun. 1, 2018 (JP) .................................. 2018-106297

(51) Int. Cl.
*B60L 58/12* (2019.01)
*B60L 7/10* (2006.01)
*B60L 50/60* (2019.01)
*B60K 6/28* (2007.10)
*H01M 10/44* (2006.01)
*H02J 7/14* (2006.01)

(52) U.S. Cl.
CPC ................ *B60L 58/12* (2019.02); *B60K 6/28* (2013.01); *B60L 7/10* (2013.01); *B60L 50/60* (2019.02); *H01M 10/44* (2013.01); *H02J 7/1423* (2013.01); *B60Y 2200/91* (2013.01); *B60Y 2200/92* (2013.01); *B60Y 2300/18125* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2010/0156352 A1* | 6/2010 | Muta ....................... | B60L 58/27 320/134 |
| 2013/0300363 A1* | 11/2013 | Mitsutani .............. | B60L 3/0046 320/109 |
| 2014/0324261 A1 | 10/2014 | Amano | |
| 2019/0366873 A1* | 12/2019 | Fujitake ................. | B60L 58/13 |
| 2020/0127465 A1* | 4/2020 | Kusumi ............ | H01M 10/0565 |

FOREIGN PATENT DOCUMENTS

| | | |
|---|---|---|
| JP | 2002-051405 A | 2/2002 |
| JP | 2017-121103 A | 7/2017 |
| WO | 2013065168 A1 | 5/2013 |

* cited by examiner

*Primary Examiner* — Cassandra F Cox

(74) *Attorney, Agent, or Firm* — Sughrue Mion, PLLC

(57) ABSTRACT

An ECU performs processing including steps as follows: in a case where an actual SOC is more than or equal to an upper limit value SOC(0) and a vehicle is in a Ready-Off state, when an SMR is in a cut-off state, the ECU performs the step of discharging a battery using discharging devices, and when the SMR is not in the cut-off state, the ECU performs the step of discharging the battery using an MG.

5 Claims, 6 Drawing Sheets

VEHICLE

This nonprovisional application is based on Japanese Patent Application No. 2018-106297 filed on Jun. 1, 2018 with the Japan Patent Office, the entire contents of which are hereby incorporated by reference.

BACKGROUND

Field

The present disclosure relates to control of a vehicle equipped with a power storage device which can be charged using electric power generated during regenerative braking.

Description of the Background Art

Recently, an electrically powered vehicle equipped with a power storage device (for example, a secondary battery or the like) and traveling by supplying electric power stored in the power storage device to a drive source such as a motor generator has attracted attention as an environmentally friendly vehicle. There is known a technique in which, when an accelerator is turned off or a brake is turned on while such an electrically powered vehicle is traveling down a hill, the power storage device is charged by regenerating energy in the motor generator (that is, regenerative braking) to improve energy efficiency. However, when the state of charge (SOC) of the power storage device is close to an upper limit value, it may be impossible to fully collect the energy generated by regenerative braking.

Regarding such a problem, for example, Japanese Patent Laying-Open No. 2002-051405 discloses a technique of effectively charging a power storage device during regenerative braking by increasing an upper limit value of the SOC of the power storage device and increasing a substantial capacity.

SUMMARY

When a power storage device is charged, with an upper limit value of the SOC of the power storage device being increased, in an electrically powered vehicle having a configuration as described above, regenerative energy can be efficiently collected, but the SOC of the power storage device may exceed an initial upper limit value. If the vehicle is left in such a state, the power storage device is left with the SOC exceeding the initial upper limit value, and deterioration of the power storage device may be accelerated.

An object of the present disclosure is to provide a vehicle which suppresses deterioration of a power storage device while efficiently collecting energy during regenerative braking.

A vehicle in accordance with an aspect with the present disclosure includes a rotating electrical machine coupled to a drive wheel of the vehicle, a power storage device, a power conversion device configured to bidirectionally convert electric power between the rotating electrical machine and the power storage device, and a control device configured to control the power conversion device. The control device is configured to, when the vehicle is in a regenerative braking state using the rotating electrical machine, permit charging exceeding an upper limit value of an SOC of the power storage device, and when it is requested to stop a system of the vehicle and the SOC of the power storage device is more than the upper limit value, perform discharging control for discharging the power storage device.

With such a configuration, since charging exceeding the upper limit value of the SOC of the power storage device is permitted when the vehicle is in the regenerative braking state using the rotating electrical machine, regenerative energy can be efficiently collected even when the SOC of the power storage device is close to the upper limit value. Further, when it is requested to stop the system of the vehicle and the SOC of the power storage device is more than the upper limit value, the discharging control for discharging the power storage device is performed. Thus, deterioration of the power storage device when the vehicle is left for a long period of time can be suppressed, when compared with a case where a state in which the SOC of the power storage device is more than the upper limit value is maintained.

In an embodiment, the control device is configured to, when it is requested to stop the system of the vehicle and the SOC of the power storage device is more than the upper limit value, perform the discharging control until the SOC of the power storage device becomes equal to the upper limit value.

With such a configuration, when it is requested to stop the system of the vehicle and the SOC of the power storage device is more than the upper limit value, the discharging control is performed until the SOC of the power storage device becomes equal to the upper limit value. Thus, deterioration of the power storage device when the vehicle is left for a long period of time can be suppressed, when compared with the case where the state in which the SOC of the power storage device is more than the upper limit value is maintained.

In an embodiment, the vehicle further includes a relay circuit provided between the power storage device and the power conversion device, and a discharging device configured to discharge the power storage device, the discharging device being connected to the power storage device without through the relay circuit. The control device is configured to, when the relay circuit is in a conductive state, perform the discharging control using an electric device located on a power conversion device side with respect to the relay circuit, and, when the relay circuit is in a cut-off state, perform the discharging control using the discharging device.

With such a configuration, since the discharging control is performed using different devices according to the state of the relay circuit, the power storage device with the SOC exceeding the upper limit value can be reliably discharged.

Further, in an embodiment, the electric device includes the rotating electrical machine. The control device is configured to perform field weakening control of the rotating electrical machine, as the discharging control.

With such a configuration, the power storage device with the SOC exceeding the upper limit value can be quickly discharged, without adding a new component for discharging the power storage device.

Further, in an embodiment, the power storage device includes a plurality of power storage elements. The discharging device includes equalization circuits, and each of the equalization circuits is configured to equalize an SOC of corresponding one of the power storage elements.

With such a configuration, the power storage device with the SOC exceeding the upper limit value can be reliably discharged, without adding a new component for discharging the power storage device.

The foregoing and other objects, features, aspects and advantages of the present disclosure will become more

DESCRIPTION OF THE PREFERRED EMBODIMENTS

Figure 1:
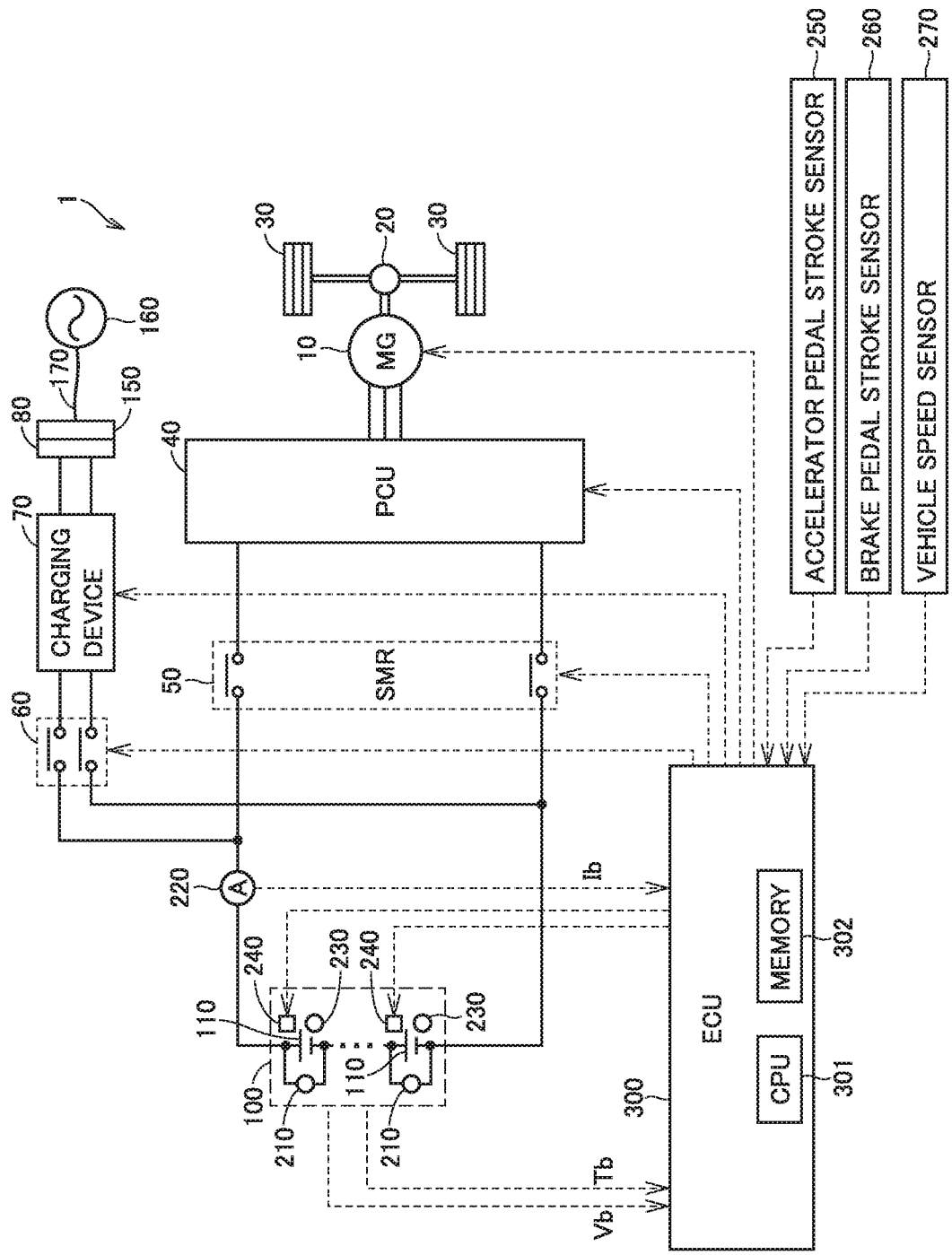
FIG. 1 is a block diagram schematically showing an entire configuration of a vehicle in accordance with the present embodiment.

Hereinafter, an embodiment of the present disclosure will be described in detail with reference to the drawings. It should be noted that identical or corresponding parts in the drawings will be designated by the same reference numerals, and the description thereof will not be repeated.

In the following, a vehicle in accordance with the embodiment of the present disclosure will be described, taking the configuration of an electric vehicle as an example.

<As to Configuration of Vehicle>

FIG. 1 is a block diagram schematically showing an entire configuration of a vehicle 1 in accordance with the present embodiment. Vehicle 1 includes a motor generator (MG) 10, a motive power transmission gear 20, drive wheels 30, a power control unit (PCU) 40, a system main relay (SMR) 50, a charging relay (hereinafter referred to as CHR) 60, a charging device 70, an inlet 80, a battery 100, voltage sensors 210, a current sensor 220, temperature sensors 230, discharging devices 240, an accelerator pedal stroke sensor 250, a brake pedal stroke sensor 260, a vehicle speed sensor 270, and an electronic control unit (ECU) 300.

MG 10 is a three-phase alternating current (AC) rotating electrical machine, for example, and has a function as an electric motor (motor) and a function as a power generator (generator). An output torque of MG 10 is transmitted to drive wheels 30 via motive power transmission gear 20 configured to include a reduction gear, a differential gear, and the like.

During braking of vehicle 1, MG 10 is driven by drive wheels 30, and MG 10 operates as a power generator. Thereby, MG 10 also functions as a braking device which performs regenerative braking for converting kinetic energy of vehicle 1 into electric power. Regenerative power generated by a regenerative braking force in MG 10 is stored in battery 100.

PCU 40 is a power conversion device configured to bidirectionally convert electric power between MG 10 and battery 100. PCU 40 includes an inverter and a converter which operate based on a control signal from ECU 300, for example.

When battery 100 is discharged, the converter boosts a voltage supplied from battery 100, and supplies it to the inverter. The inverter converts direct current (DC) power supplied from the converter into AC power, and drives MG 10.

In contrast, when battery 100 is charged, the inverter converts AC power generated by MG 10 into DC power, and supplies it to the converter. The converter bucks a voltage supplied from the inverter to a voltage suitable for charging battery 100, and supplies it to battery 100.

In addition, PCU 40 stops charging/discharging by stopping operation of the inverter and the converter based on a control signal from ECU 300. It should be noted that PCU 40 may be configured not to have a converter.

SMR 50 is electrically connected to power lines connecting battery 100 and PCU 40. When SMR 50 is closed (that is, in a conductive state) in response to a control signal from ECU 300, electric power can be transmitted and received between battery 100 and PCU 40. In contrast, when SMR 50 is opened (that is, in a cut-off state) in response to a control signal from ECU 300, electrical connection between battery 100 and PCU 40 is cut off.

CHR 60 is electrically connected between battery 100 and charging device 70. When CHR 60 is closed (that is, in a conductive state) in response to a control signal from ECU 300, and a connector 150 of an external power source is attached to inlet 80 described later, electric power can be transmitted and received between battery 100 and charging device 70. In contrast, when CHR 60 is opened (that is, in a cut-off state) in response to a control signal from ECU 300, electrical connection between battery 100 and charging device 70 is cut off.

Inlet 80 is provided to an exterior portion of vehicle 1, together with a cover (not shown) such as a lid. Inlet 80 has a shape to which connector 150 described later cart be mechanically connected. Both inlet 80 and connector 150 have contacts therein. When connector 150 is attached to inlet 80, the contacts are brought into contact with each other, and thereby inlet 80 and connector 150 are electrically connected.

Connector 150 is connected to a system power source 160 via a charging cable 170. Thus, when connector 150 is connected to inlet 80 of vehicle 1, electric power front system power source 160 can be supplied to vehicle 1 via charging cable 170, connector 150, and inlet 80.

Charging device 70 is electrically connected to battery 100 via CHR 60, and is electrically connected to inlet 80. In response to a control signal from ECU 300, charging device 70 converts AC power supplied from system power source 160 into DC power, and outputs it to battery 100. For example, when connector 150 is attached to inlet 80, charging device 70 charges battery 100 using the electric power supplied from system power source 160.

Battery 100 is a power storage device which stores electric power for driving MG 10. Battery 100 is a rechargeable DC power source, and is composed of a plurality of cells 110 connected in series, for example. Cell 110 is a secondary battery such as a lithium ion secondary battery or a nickel hydrogen secondary battery, for example.

Voltage sensor 210 detects a voltage Vb between terminals of each of the plurality of cells 110. Current sensor 220 detects a current Ib input to and output from battery 100.

Temperature sensor 230 detects a temperature Tb of each of the plurality of cells 110. Each sensor outputs a detection result thereof to ECU 300.

Discharging device 240 is connected to each of the plurality of cells 110, and discharges each of the plurality of cells 110 in response to a control signal from ECU 300. Discharging device 240 is configured to include a discharging resistor and a switch, for example.

Figure 2:
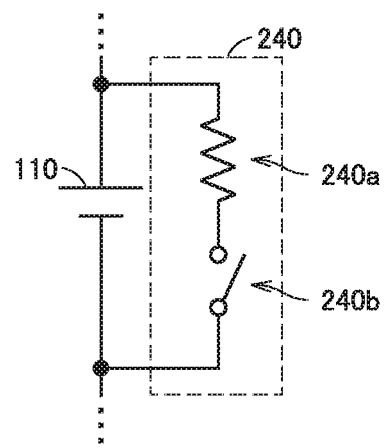
FIG. 2 is a view showing an example of a configuration of a discharging device.

FIG. 2 is a view showing an example of a configuration of discharging device 240. As shown in FIG. 2, discharging device 240 is a circuit connected in parallel to cell 110, and having a discharging resistor 240a and a switch 240b connected in series.

With such a configuration, for example, when switch 240b is turned on in response to a control signal from ECU 300, electric power in cell 110 is discharged by discharging resistor 240a. Discharging device 240 is an equalization circuit which equalizes the SOC of each of the plurality of cells 110 by individually discharging the plurality of cells 110.

Accelerator pedal stroke sensor 250 detects an operation amount of an accelerator pedal (not shown) of vehicle 1 (hereinafter also referred to as an accelerator position). Brake pedal stroke sensor 260 detects an operation amount of a brake pedal (not shown) of vehicle 1 (hereinafter also referred to as a brake pedal depression amount). Vehicle speed sensor 270 detects a speed of vehicle 1 (hereinafter referred to as a vehicle speed). Each sensor outputs a detection result thereof to ECU 300.

ECU 300 includes a central processing unit (CPU) 301, a memory (a read only memory (ROM) and a random access memory (RAM)) 302, and an input/output buffer (not shown). ECU 300 controls each device such that vehicle 1 will achieve a desired state, based on a signal received from each sensor and information such as maps and programs stored in memory 302.

<As to Charging/Discharging Control for Battery 100>

Generally, a power storage amount of battery 100 is managed based on the state of charge (SOC) indicating the ratio of a present power storage amount to a full charging capacity, expressed in percentage. ECU 300 has a function of sequentially calculating the SOC of battery 100 based on values detected by voltage sensors 210, current sensor 220, and temperature sensors 230. As a method for calculating the SOC, various known techniques can be adopted, such as a technique using current value integration (coulomb counting), or a technique using estimation of an open circuit voltage (OCV), for example.

During operation of vehicle 1, battery 100 is charged or discharged by the regenerative power or discharging power generated by MG 10. ECU 300 controls output of MG 10 such that MG 10 will output power for generating a vehicle driving force (requested driving force set according to the accelerator position) or braking force (requested decelerating force set according to the brake pedal depression amount or the vehicle speed) requested from a driver.

In contrast, when vehicle 1 is in a stopped state and connector 150 is connected to inlet 80, ECU 300 turns on CHR 60 and operates charging device 70 to charge battery 100 using the electric power from system power source 160.

For example, ECU 300 continues charging until the SOC of battery 100 reaches an upper limit value SOC(0), and terminates charging when the SOC of battery 100 reaches upper limit value SOC(0). More specifically, ECU 300 sets a charging power upper limit value Win, according to the SOC of battery 100. Then, ECU 300 sets charging power upper limit value Win to zero when the SOC of battery 100 reaches upper limit value SOC(0), and thereby terminates charging.

Figure 3:
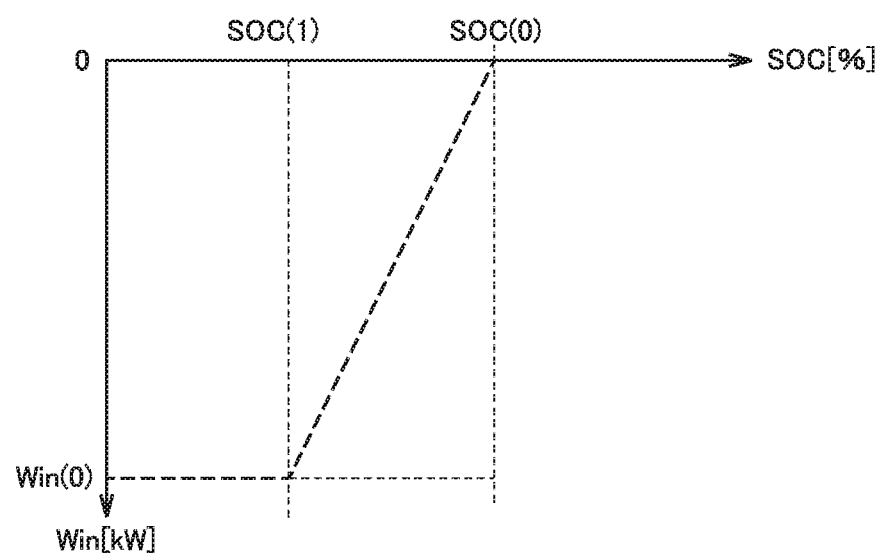
FIG. 3 is a view showing the relation between a charging power upper limit value Win and the SOC of a battery.

FIG. 3 is a view showing the relation between charging power upper limit value Win and the SOC of battery 100. The axis of ordinates in FIG. 3 indicates charging power upper limit value Win. The axis of abscissas in FIG. 3 indicates the SOC. A broken line in FIG. 3 indicates the relation between charging power upper limit value Win and the SOC in battery 100.

As indicated by the broken line in FIG. 3, ECU 300 maintains charging power upper limit value Win at a predetermined value Win(0) until the SOC of battery 100 reaches an SOC(1), for example. Then, when the SOC is more than SOC(1), ECU 300 sets charging power upper limit value Win such that the magnitude of charging power upper limit value Win decreases with an increase in the SOC. When the SOC reaches SOC(0), ECU 300 sets zero as charging power upper limit value Win. Since charging power upper limit value Win is set to zero in this manner, charging is terminated.

<As to Charging Processing by Regenerative Braking Performed while Vehicle 1 is Traveling Down Hill>

When vehicle 1 having a configuration as described above travels down a hill, energy efficiency can be improved by regenerating energy in MG 10 (that is, regenerative braking). However, for example in a case where battery 100 is charged using system power source 160 such that the SOC reaches upper limit value SOC(0), and thereafter vehicle travels down the hill, when the SOC of battery 100 becomes close to upper limit value SOC(0), zero is set as charging power upper limit value Win as described using FIG. 3, and charging is suppressed. Accordingly, it may be impossible to fully collect the energy generated by regenerative braking.

For such a problem, it is conceivable, for example, to perform processing for permitting charging exceeding the upper limit value of the SOC of battery 100 when vehicle 1 is in a regenerative braking state.

Figure 4:
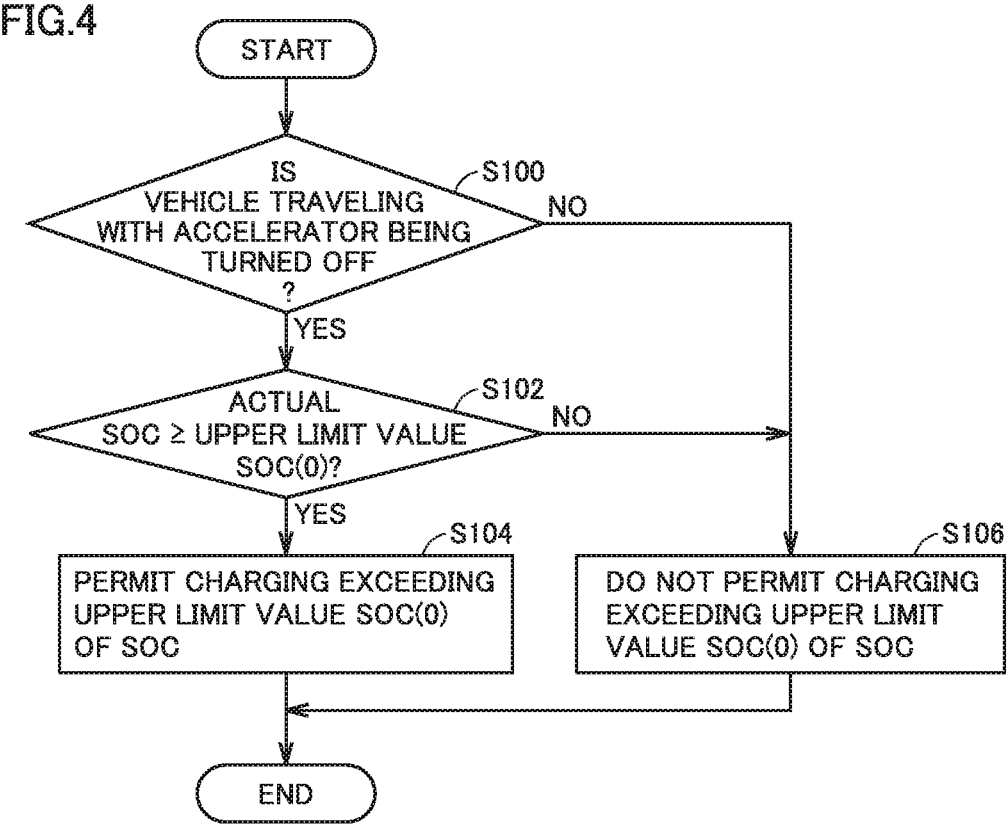
FIG. 4 is a flowchart showing an example of processing for permitting charging exceeding an upper limit value of the SOC of the battery.

In the following, the processing for permitting charging exceeding the upper limit value of the SOC of battery 100 will be described with reference to FIG. 4. FIG. 4 is a flowchart showing an example of the processing for permitting charging exceeding the upper limit value of the SOC of battery 100. The processing shown in this flowchart is performed repeatedly at a predetermined processing cycle by ECU 300 shown in FIG. 1.

In step (hereinafter referred to as S) 100, ECU 300 determines whether or not vehicle 1 is traveling with the accelerator being turned off. For example, when the vehicle speed is more than a threshold value and the accelerator position is less than a threshold value, ECU 300 determines that vehicle 1 is traveling with the accelerator being turned off. The threshold value of the vehicle speed is a value indicating a vehicle speed at which regenerative braking is possible, and is a predetermined value, for example. In addition, the threshold value of the accelerator position is a value for determining that the accelerator position is zero, and is a predetermined value, for example. These threshold values are adapted through experiments and the like. When it is determined that vehicle 1 is traveling with the accelerator being turned off (YES in S100), the processing proceeds to S102.

In S102, ECU 300 determines whether or not a present SOC (hereinafter referred to as an actual SOC) is more than or equal to upper limit value SOC(0) of the SOC of battery 100 (that is, whether or not the actual SOC reaches upper limit value SOC(0)). For example, ECU 300 estimates the actual SOC of battery 100 using the detection results of voltage sensors 210, current sensor 220, and temperature sensors 230. When it is determined that the actual SOC is more than or equal to upper limit value SOC(0) (YES in S102), the processing proceeds to S104.

In S104, ECU 300 permits charging exceeding upper limit value SOC(0) of the SOC of battery 100.

Specifically, ECU 300 changes the upper limit value of the SOC of battery 100, from SOC(0) to an SOC(2) which is more than SOC(0).

Figure 5:
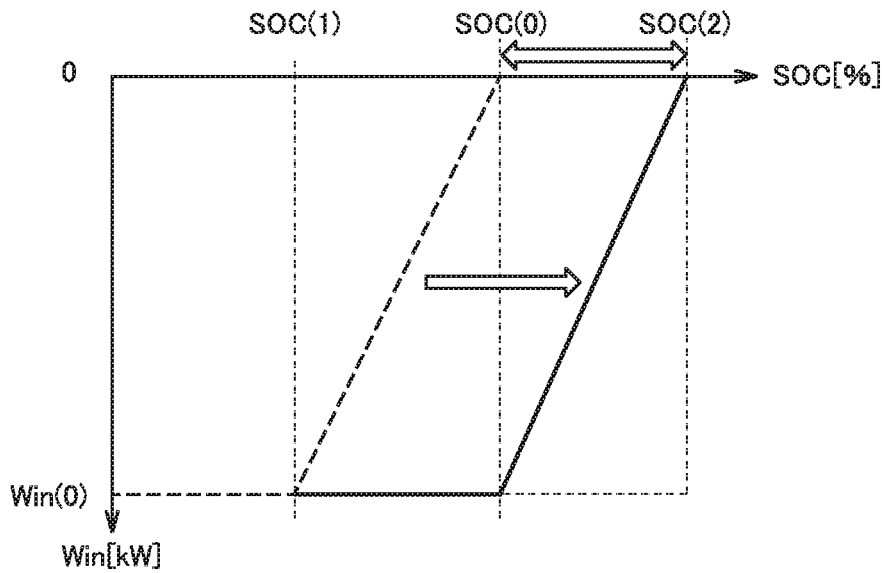
FIG. 5 is a view showing the relation between charging power upper limit value Win and the SOC of the battery after change.

FIG. 5 is a view showing the relation between charging power upper limit value Win and the SOC of the battery after change. The axis of ordinates in FIG. 5 indicates charging power upper limit value Win. The axis of abscissas in FIG. 5 indicates the SOC. A broken line in FIG. 5 indicates the relation between charging power upper limit value Win and the SOC in battery 100 before change. A solid line in FIG. 5 indicates the relation between charging power upper limit value Win and the SOC in battery 100 after change.

As indicated by the solid line in FIG. 5, ECU 300 maintains charging power upper limit value Win at predetermined value Win(0) until the actual SOC of battery 100 reaches SOC(0), for example. Then, when the actual SOC is more than SOC(0), ECU 300 sets charging power upper limit value Win such that the magnitude of charging power upper limit value Win decreases with an increase in the actual SOC. When the actual SOC reaches SOC(2), ECU 300 sets zero as charging power upper limit value Win. Since charging power upper limit value Win is set to zero in this manner, charging is terminated. It should be noted that the difference between SOC(0) and SOC(2) is about several percent, for example.

In S106, ECU 300 does not permit charging exceeding upper limit value SOC(0) of the SOC of battery 100. Specifically, ECU 300 sets the upper limit value of the SOC of battery 100 to SOC(0). Since the charging control when the upper limit value is set to SOC(0) is as described above using FIG. 3, the detailed description thereof will not be repeated.

It should be noted that, when it is determined that vehicle 1 is not traveling with the accelerator being turned off (NO in S100), and when it is determined that the actual SOC is less than upper limit value SOC(0) (NO in S102), the processing proceeds to S106.

By performing processing as described above, when a user releases depression of the accelerator pedal while vehicle 1 is traveling (YES in S100) and the actual SOC of battery 100 becomes more than or equal to upper limit value SOC(0) (YES in S102), the upper limit value of the SOC is changed from SOC(0) to SOC(2), and thereby charging exceeding upper limit value SOC(0) is permitted (S104). Accordingly, for example when vehicle 1 is in the regenerative braking state, the actual SOC is permitted to exceed SOC(0). Since charging exceeding upper limit value SOC(0) of the SOC of battery 100 is permitted in this manner, it is possible to efficiently collect the energy generated by regenerative braking.

However, in the case where charging exceeding the upper limit value of the SOC of battery 100 is permitted, when vehicle 1 is stopped and left, battery 100 is left with the actual SOC exceeding the upper limit value of the SOC. Thus, deterioration of battery 100 may be accelerated.

Accordingly, in the present embodiment, ECU 300 is configured to operate as follows. Specifically, ECU 300 is configured such that, when vehicle 1 is in the regenerative braking state using MG 10, ECU 300 permits charging exceeding the upper limit value of the SOC of battery 100. Further, ECU 300 is configured such that, when traveling of vehicle 1 is suppressed, ECU 300 performs discharging control for discharging a portion of the SOC of battery 100 exceeding the upper limit value.

With such a configuration, since charging exceeding upper limit value SOC(0) of the SOC of battery 100 is permitted when vehicle 1 is in the regenerative braking state using MG 10, regenerative energy can be efficiently collected even when the SOC of battery 100 is close to upper limit value SOC(0). Further, since the portion exceeding upper limit value SOC(0) is discharged when the traveling of vehicle 1 is suppressed, deterioration of battery 100 can be suppressed even when vehicle 1 is left for a long period of time.

<As to Details of Processing of Discharging Control for Battery 100>

Figure 6:
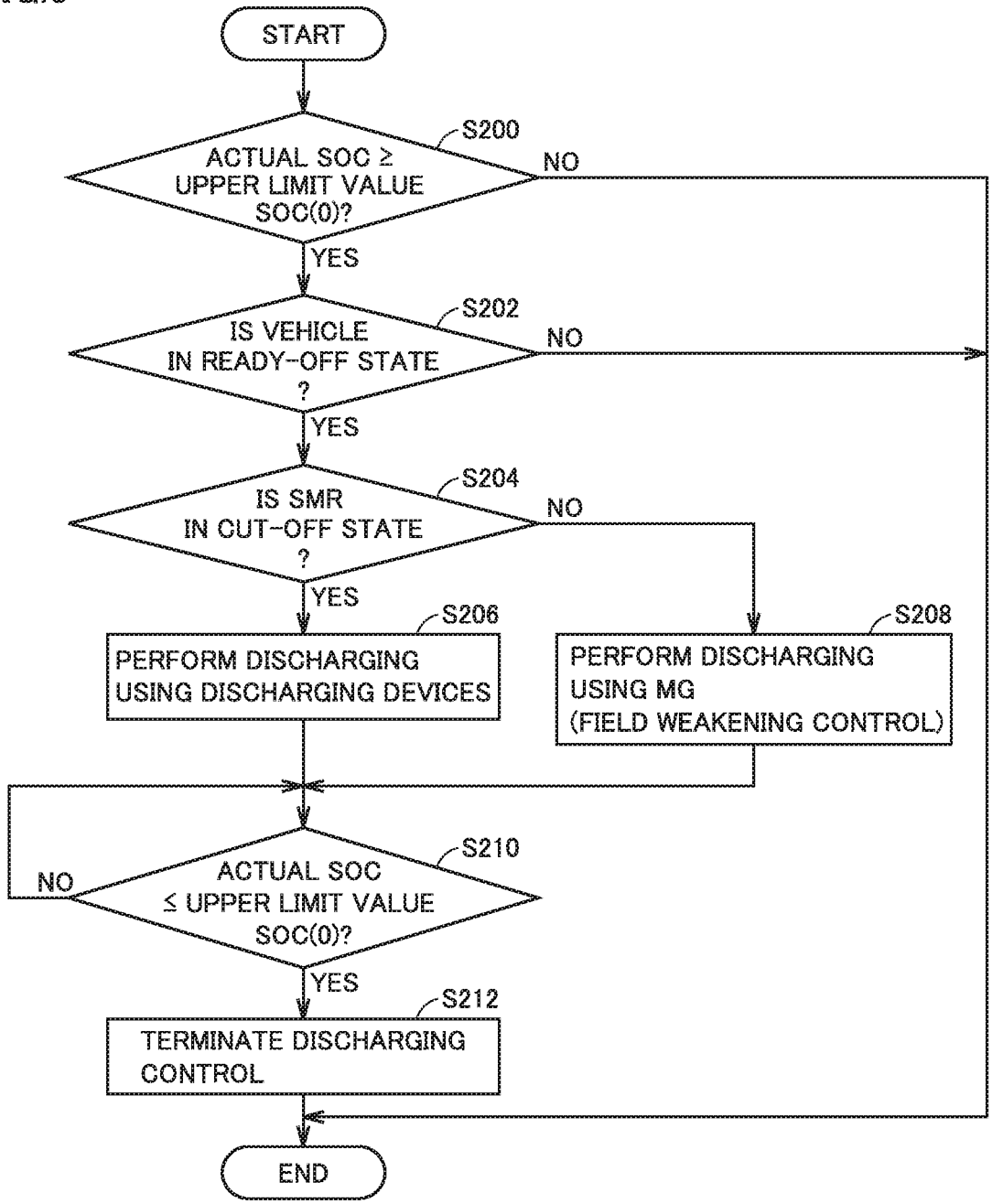
FIG. 6 is a flowchart showing an example of processing of discharging control performed by an ECU.

In the following, processing performed by ECU 300 will be described with reference to FIG. 6. FIG. 6 is a flowchart showing an example of processing of discharging control performed by ECU 300. The control processing shown in this flowchart is performed by ECU 300 shown in FIG. 1, every time a predetermined period elapses (for example, whenever a predetermined period has elapsed since the termination of previous processing).

In S200, ECU 300 determines whether or not the actual SOC is more than or equal to upper limit value SOC(0) of the SOC of battery 100. When it is determined that the actual SOC is more than or equal to upper limit value SOC(0) (YES in S200), the processing proceeds to S202.

In S202, ECU 300 determines whether or not vehicle 1 is in a Ready-Off state. The Ready-Off state is a state in which a system of vehicle 1 is stopped and vehicle 1 does not travel even though the user operates the accelerator pedal. More specifically, the Ready-Off state is a state in which operation of electric devices relevant to the traveling of vehicle 1, such as MG 10 and PCU 40, is stopped. When ECU 300 receives operation of a start switch in a case where vehicle 1 is in a Ready-On state in which vehicle 1 can travel, ECU 300 shifts the state of vehicle 1 from the Ready-On state to the Ready-Off state. When ECU 300 shifts the state of vehicle 1 to the Ready-Off state, ECU 300 performs processing for stopping the operation of the electric devices relevant to the traveling of vehicle 1, and thereafter sets SMR 50 to the cut-off state. It should be noted that the processing for stopping the operation of the electric devices relevant to the traveling of vehicle 1 includes predetermined abnormality detection processing, for example. When ECU 300 receives the operation of the start switch in the case where vehicle 1 is in the Ready-On state, or when the system of vehicle 1 is stopped, ECU 300 determines that vehicle 1 is in the Ready-Off state. When it is determined that vehicle 1 is in the Ready-Off state (YES in S202), the processing proceeds to S204.

In S204, ECU 300 determines whether or not SMR 50 is in the cut-off state. When it is determined that SMR 50 is in the cut-off state (YES in S204), the processing proceeds to S206. In S206, ECU 300 performs discharging control for discharging battery 100 until the SOC of battery 100 becomes equal to SOC(0), using discharging devices 240. That is, ECU 300 discharges each of the plurality of cells 110 by turning on switch 240b of each discharging device 240 provided in battery 100.

It should be noted that, when it is determined that SMR 50 is in the conductive state (NO in S204), the processing proceeds to S208. In S208, ECU 300 performs discharging control for discharging battery 100 until the SOC of battery 100 becomes equal to SOC(0), using MG 10. ECU 300 performs field weakening control of MG 10, for example. That is, ECU 300 controls PCU 40 to generate, in PCU 40, a d-axis current component in a direction in which the field of MG 10 is weakened, and to output the component to MG 10.

In S210, ECU 300 determines whether or not the actual SOC is less than or equal to upper limit value SOC(0) of the SOC of battery 100. When it is determined that the actual SOC is less than or equal to upper limit value SOC(0) (YES in S210), the processing proceeds to S212. It should be noted that, when it is determined that the actual SOC is more than upper limit value SOC(0) (NO in S210), the processing is returned to S210.

In S212, ECU 300 terminates the discharging control. That is, when battery 100 is discharged using discharging devices 240, ECU 300 turns off switches 240b. In addition, when battery 100 is discharged by field weakening control, ECU 300 terminates the field weakening control.

Further, when it is determined that the actual SOC is less than upper limit value SOC(0) (NO in S200), or when it is determined that vehicle 1 is not in the Ready-Off state (that is, vehicle 1 is in the Ready-On state) (NO in S202), the processing shown in the flowchart of FIG. 6 is terminated.

<As to Operation of ECU 300 in Present Embodiment>

Operation of ECU 300 based on the structure and the flowchart as described above will be described with reference to FIGS. 7, 8, and 9.

Figure 7:
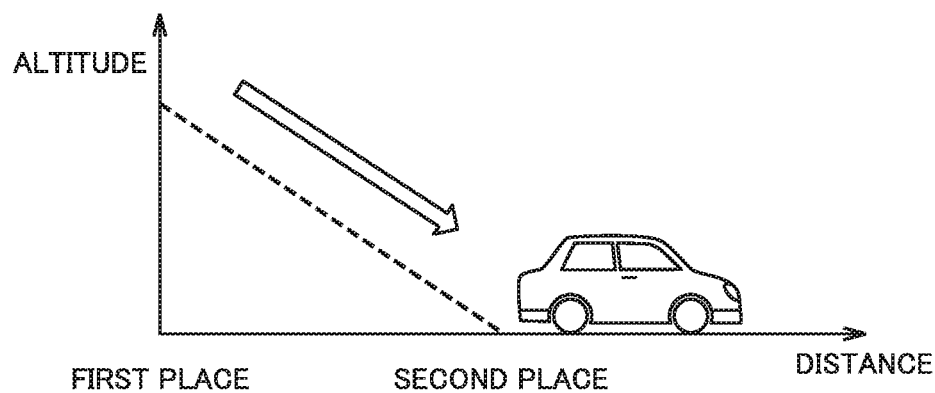
FIG. 7 is a view for illustrating an environment in which a vehicle 1 travels, serving as a premise.

FIG. 7 is a view for illustrating an environment in which vehicle 1 travels, serving as a premise. For example, it is assumed that vehicle 1 travels down a hill, from a first place having an altitude, to a second place having an altitude lower than that of the first place and spaced from the first place by a distance proportional to the difference in altitude, as shown in FIG. 7.

When the user releases depression of the accelerator pedal while vehicle 1 is traveling down the hill, the requested decelerating force is set to vehicle 1 according to the vehicle speed, and PCU 40 is controlled such that the set requested decelerating force is generated. Thereby, the regenerative braking force generated in MG 10 acts on vehicle 1.

On this occasion, even though it is determined that vehicle 1 is traveling with the accelerator being turned off (YES in S100), when the actual SOC of battery 100 does not reach upper limit value SOC(0) (NO in S102), battery 100 is charged using the energy generated by regenerative braking.

In contrast, when the actual SOC of battery 100 reaches upper limit value SOC(0) (YES in S102), charging exceeding upper limit value SOC(0) of the SOC of battery 100 is permitted (S104). Thus, charging of battery 100 using the energy generated by regenerative braking is continued.

Figure 8:
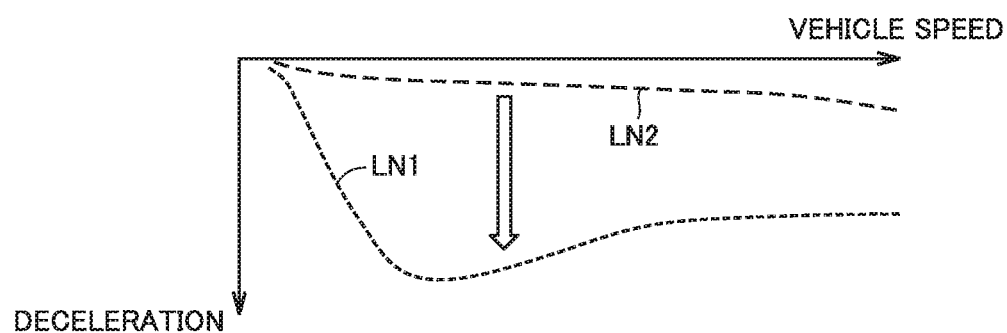
FIG. 8 is a view showing the relation between a deceleration and a vehicle speed of the vehicle traveling down a hill.

FIG. 8 is a view showing an example of the relation between a deceleration and the vehicle speed of vehicle 1 traveling down the hill. The axis of ordinates in FIG. 8 indicates the deceleration. The axis of abscissas in FIG. 8 indicates the vehicle speed. An LN1 (a short broken line) in FIG. 8 indicates the relation between the deceleration and the vehicle speed when charging exceeding upper limit value SOC(0) is permitted in the case where the SOC of battery 100 reaches upper limit value SOC(0). An LN2 (a long broken line) in FIG. 8 indicates the relation between the deceleration and the vehicle speed when charging exceeding upper limit value SOC(0) is not permitted in the case where the SOC of battery 100 reaches upper limit value SOC(0).

As indicated by LN2 in FIG. 8, when charging exceeding upper limit value SOC(0) is not permitted, regenerative braking cannot be performed. Thus, the set requested decelerating force cannot be generated. In contrast, as indicated by LN1 in FIG. 8, when charging exceeding upper limit value SOC(0) is permitted, regenerative braking can be performed. Thus, the set requested decelerating force can be generated, and charging of battery 100 using the energy generated by regenerative braking can be performed.

Thus, since charging exceeding upper limit value SOC(0) is permitted while vehicle 1 is moving from the first place to the second place, the actual SOC of battery 100 becomes more than upper limit value SOC(0).

It is assumed that vehicle 1 is thereafter stopped and the user sets vehicle 1 to the Ready-Off state.

Since the actual SOC of battery 100 is more than upper limit value SOC(0) (YES in S200) as described above, it is determined whether or not vehicle 1 is in the Ready-Off state (S202).

When vehicle 1 shifts from the Ready-On state to the Ready-Off state (YES in S202) for example through the operation of the start switch by the user, it is determined whether or not SMR 50 is in the cut-off state (S204).

When SMR 50 enters the cut-off state (YES in S204) immediately after vehicle 1 shifts to the Ready-Off state, the discharging control using discharging devices 240 is performed (S206). In contrast, when SMR 50 does not enter the cut-off state immediately after vehicle 1 shifts to the Ready-Off state, and SMR 50 continues to be in the conductive state (NO in S204), the discharging control using MG 10 (field weakening control) is performed (S208).

Figure 9:
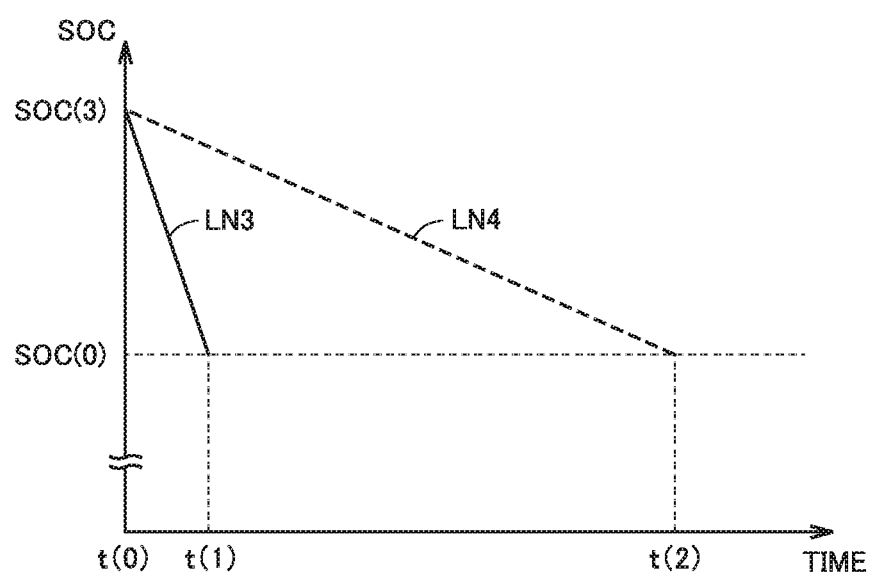
FIG. 9 is a timing chart showing a change in the SOC when the discharging control is performed.

FIG. 9 is a timing chart showing a change in the SOC when the discharging control is performed. The axis of ordinates in FIG. 9 indicates the SOC. The axis of abscissas in FIG. 9 indicates time. An LN3 (a solid line) in FIG. 9 indicates a change in the SOC of battery 100 when the discharging control using MG 10 is performed. An LN4 (a long broken line) in FIG. 9 indicates a change in the SOC of battery 100 when the discharging control using discharging devices 240 is performed.

For example, it is assumed that the SOC of battery 100 is an SOC(3) which is less than SOC(2) and more than SOC(0), and the discharging control is started at a time t(0).

As indicated by LN3 in FIG. 9, when the discharging control using MG 10 is performed, a discharging amount per unit time is larger than that when discharging is performed using discharging devices 240. Thus, the discharging control started at time t(0) is terminated when the SOC reaches SOC(0) at a time t(1).

In contrast, as indicated by LN4 in FIG. 9, when the discharging control using discharging devices 240 is performed, a discharging amount per unit time is smaller than that when discharging is performed using MG 10. Thus, the discharging control started at time t(0) is terminated when the SOC reaches SOC(0) at a time t(2) later than time t(1).

<As to Function and Effect>

As described above, according to the vehicle in accordance with the present embodiment, since charging exceeding upper limit value SOC(0) of the SOC of battery 100 is permitted when vehicle 1 is in the regenerative braking state using MG 10, regenerative energy can be efficiently collected even when the SOC of battery 100 is close to the upper limit value. Further, since the portion exceeding upper limit value SOC(0) is discharged when vehicle 1 is in the Ready-Off state, deterioration of battery 100 can be suppressed even when vehicle 1 is left for a long period of time. Therefore, it is possible to provide a vehicle which suppresses deterioration of a power storage device while efficiently collecting energy during regenerative braking.

Further, when SMR 50 is in the conductive state, the discharging control is performed by the field weakening control using MG 10. Thus, the portion of the SOC of battery 100 exceeding upper limit value SOC(0) can be quickly discharged, without adding a new component.

Further, when SMR 50 is in the cut-off state, the discharging control using discharging devices 240, which are equalization circuits, is performed. Thus, the portion of the SOC of battery 100 exceeding upper limit value SOC(0) can be reliably discharged, without adding a new component.

<As to Variations>

Although it has been described in the above embodiment that vehicle 1 is an electric vehicle, vehicle 1 may be any vehicle equipped with at least a driving rotating electrical machine and a power storage device which transmits power to and receives power from the driving rotating electrical machine, and vehicle 1 is not particularly limited to an electric vehicle. For example, vehicle 1 may be a hybrid vehicle (including a plug-in hybrid vehicle) equipped with a driving electric motor and an engine.

Further, although it has been described as an example in the above embodiment that vehicle 1 is configured to be equipped with a single motor generator, vehicle 1 may be configured to be equipped with a plurality of motor generators. In this case, the discharging control may be performed in each of the plurality of motor generators.

Further, although it has been described as an example in the above embodiment that battery 100 is composed of the plurality of cells 110 connected in series, battery 100 may be composed of cells 110 connected in parallel, or may be composed of a plurality of cell blocks connected in series, each cell block being composed of cells 110 connected in parallel.

Further, although it has been described in the above embodiment that the timing at which SMR 50 enters the cut-off state after vehicle 1 shifts to the Ready-Off state is not particularly limited, SMR 50 may enter the cut-off state, for example, at a predetermined timing after vehicle 1 shifts to the Ready-Off state. For example, ECU 300 may set SMR 50 to the conductive state until the user of vehicle 1 performs operation of opening a door when the user gets off vehicle 1, and may set SMR 50 to the cut-off state when the user's operation of opening the door is detected using a sensor, a switch, or the like provided to the door. Alternatively, ECU 300 may set SMR 50 to the cut-off state after a predetermined time has elapsed since the shift to the Ready-Off state.

Further, although it has been described as an example in the above embodiment that discharging device 240 is provided to each of the plurality of cells 110, a discharging device composed of a resistor, a switch, and the like may be connected in parallel to battery 100.

Further, although it has been described as an example in the above embodiment that the discharging control is performed using MG 10 when vehicle 1 is in the Ready-Off state and SMR 50 is in the conductive state, it is only necessary when SMR 50 is in the conductive state that the discharging control can be performed using an electric device located on the PCU 40 side with respect to SMR 50, and the discharging control is not particularly limited to being performed using MG 10. For example, the discharging control for discharging battery 100 may be performed by operating an air conditioning system (not shown) when vehicle 1 is in the Ready-Off state and SMR 50 is in the conductive state.

Further, although it has been described as an example in the above embodiment that field weakening control is performed when the discharging control is performed using MG 10, it is only necessary that PCU 40 can be controlled such that at least a torque which would not move vehicle 1 is generated in MG 10, and performing the discharging control using MG 10 is not particularly limited to performing field weakening control.

Further, although it has been described as an example in the above embodiment that only the discharging control is performed using MG 10 when vehicle 1 is in the Ready-Off state and SMR 50 is in the conductive state, ECU 300 may perform the discharging control using MG 10 and the discharging control using discharging devices 240 in parallel, or may perform the discharging controls by switching therebetween at a predetermined timing, when vehicle 1 is in the Ready-Off state and SMR 50 is in the conductive state.

Further, although it has been described as an example in the above embodiment that the discharging control for discharging battery 100 at a fixed discharging amount is performed using MG 10 or discharging devices 240 according to the state of SMR 50 when vehicle 1 is in the Ready-Off state, a discharging amount per unit time may be set according to the temperature of battery 100, and battery 100 may be discharged to achieve the set discharging amount per unit time. In this case, for example, the discharging amount per unit time may be set smaller with an increase in the temperature of battery 100. Alternatively, battery 100 may be discharged with the discharging amount per unit time being changed with time, according to a change in the temperature of battery 100.

Further, although it has been described in the above embodiment that it is determined whether or not SMR 50 is in the cut-off state after it is determined that vehicle 1 is in the Ready-Off state, ECU 300 may perform the discharging control according to the state of SMR 50, after a predetermined time has elapsed since the determination that vehicle 1 is in the Ready-Off state, for example.

Further, although it has been described in the above embodiment that the discharging control is performed using MG 10 or discharging devices 240 according to the state of SMR 50 when vehicle 1 is in the Ready-Off state, the discharging control may be performed using any of MG 10 and discharging devices 240 according to the temperature of battery 100 when vehicle 1 is in the Ready-Off state. For example, ECU 300 may perform the discharging control using discharging devices 240 when the temperature of battery 100 is higher than a threshold value, irrespective of whether or not SMR 50 is in the cut-off state.

It should be noted that the variations described above may be entirely or partially combined as appropriate for implementation.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:
1. A vehicle comprising:
a rotating electrical machine coupled to a drive wheel of the vehicle;
a power storage device;
a power conversion device configured to bidirectionally convert electric power between the rotating electrical machine and the power storage device; and
a control device configured to control the power conversion device,
the control device being configured to when the vehicle is in a regenerative braking state using the rotating electrical machine, permit charging exceeding an upper limit value of an SOC of the power storage device, and when it is requested to stop a system of the vehicle and the SOC of the power storage device is more than the upper limit value, perform discharging control for discharging the power storage device.

2. The vehicle according to claim 1, wherein the control device is configured to, when it is requested to stop the system of the vehicle and the SOC of the power storage device is more than the upper limit value, perform the discharging control until the SOC of the power storage device becomes equal to the upper limit value.

3. The vehicle according to claim 1, further comprising:
a relay circuit provided between the power storage device and the power conversion device; and
a discharging device configured to discharge the power storage device, the discharging device being connected to the power storage device without through the relay circuit, wherein the control device is configured to when the relay circuit is in a conductive state, perform the discharging control using an electric device located on a power conversion device side with respect to the relay circuit, and when the relay circuit is in a cut-off state, perform the discharging control using the discharging device.

4. The vehicle according to claim 3, wherein
the electric device includes the rotating electrical machine, and
the control device is configured to perform field weakening control of the rotating electrical machine, as the discharging control.

5. The vehicle according to claim 3, wherein
the power storage device includes a plurality of power storage elements, and
the discharging device includes equalization circuits, and each of the equalization circuits is configured to equalize an SOC of corresponding one of the power storage elements.

* * * * *